United States Patent Office 3,272,637
Patented Sept. 13, 1966

3,272,637
POLISH EMULSIONS OF SYMMETRICAL WAX ESTERS OF ACETYLENEDICARBOXYLIC ACID AND SATURATED ALCOHOLS
Leslie L. Sims, Baton Rouge, La., assignor to Ethyl Corporation, New York, N.Y., a corporation of Virginia
No Drawing. Filed Nov. 23, 1964, Ser. No. 413,362
4 Claims. (Cl. 106—10)

This application is a continuation-in-part of my prior copending applications, Serial Numbers 189,975, filed April 25, 1962; 189,998, filed April 25, 1962; 224,235, filed September 17, 1962; and 317,047, filed October 17, 1963. Application Serial Numbers 189,975, 189,998; 224,235 and 317,047 are now abandoned.

The present invention relates to novel wax formulations. More particularly, this invention relates to a novel multi-component polishing wax emulsion.

Carnauba wax, as outlined by Warth in "The Chemistry and Technology of Waxes," 2nd edition (1960), Reinhold Publishing Company, New York, is recognized as the superior wax in the art, however, it is very expensive. Carnauba wax is obtained from the leaves of a species of a South American genus of palm designated as the *Copernicia cerifera*. The mature leaves of the palm are cut from the tree and sun-dried. After the drying step, which loosens the wax from the leaves, the leaves are transported to sheds. The leaves are ripped apart by hand and beaten to remove the wax dust which is then recovered from the floor. The average leaf of the palm yields only about 5 grams of wax. The average tree gives a maximum of about 20 leaves a year. Thus, five palms give about one pound of wax per year. This small yield of wax necessitates having about 50,000,000 trees in production. The average yields and quality of this wax, like other agricultural crops, are also directly affected by the weather during the growing year.

Candelilla wax is obtained from the surface of a plant of the Euphorbia species which grows primarily in the arid regions of northern Mexico. The general practice is to harvest the candelilla plant by manually pulling up the stalks, roots and all, and to extract the whole plant in the producing area. (A harvester must pull 1,000 pounds of the plant to produce 30 pounds of wax.) The wax is extracted from the plants by boiling the entire plants in steel cooking tanks until the wax begins to float to the surface. The wax is then manually scraped from the surface and placed in another cooking tank where it is boiled again. After boiling for the second time for a sufficient period, the water is drawn off from the tank and the wax cake is removed. The center layer of the cake is cut out and packed for shipment to refineries. The top and bottom portions which contain a high percentage of foreign matter are thrown back into the tank with the next charge. The crude wax, which contains a considerable amount of dirt, sand and other foreign matter, is then shipped to refineries. The refining comprises melting the wax in a steel cooking tank with continuous manual stirring for many hours. Small amounts of sulfuric acid are added to destroy foreign matter. The wax is then allowed to solidify, broken up into lumps, packed and shipped to trade centers. The refined candelilla wax of commerce is opaque and brownish or yellow-brown in color.

Thus, it is seen that carnauba and candelilla wax are not too plentiful, are expensive to produce and are of various quality.

In the past, many schemes have been attempted to produce new waxes and additives for various waxes so as to approximate many of the beneficial properties of carnauba and candelilla wax with cheaper and more abundant materials. One such scheme has been to esterify a mixture of montanic acids with polyhydric alcohols to obtain products which are somewhat superior to montanic acids as waxes. Still another scheme has been to convert free acid groups of products obtained by partial esterification of montanic acids with polyhydric alcohols largely into salts by reacting them with substances forming wax soaps and thus to obtain waxes which are characterized by very good oil binding properties and yielding paste, leaving behind a wax film. The products obtained by this method are soft, however.

It has also been known in the past to produce ester waxes by reacting aliphatic acids having more than 18 carbon atoms, such as acids contained in montan wax, with aromatic methylols. These acids are first bleached by oxidation and then reacted with the aromatic dimethylol. It was taught in U.S. Patent 2,963,379 that the reaction product of aliphatic acids having more than 18 carbon atoms with aliphatic alcohols will not produce waxes with hardness in the carnauba-candelilla wax range.

U.S. Patent 2,877,123 has described proportionately mixed saturated straight chain and saturated branched chain dibasic acid esters each ester containing a total of 16 to 64 carbon atoms. Typical of the esters described therein are the dimethyl ester of octadecadiene-7,11-dicarboxylic acid-1,18; dimethyl ester of 7-vinylhexadecene-9-dicarboxylic acid-1,16; dimethyl ester of the $C_{20}$-diethylenic dicarboxylic acids, and the like. These products are described as soft, semi-solids at room temperature and therefore do not possess a hardness approaching that of carnauba and candelilla wax.

It is therefore an object of the present invention to provide a new, relatively inexpensive, wax which can be readily synthesized from available raw materials and which has hardness within the carnauba-candelilla range or very close thereto.

Other objects will appear more fully hereinafter.

It has now been found that hard waxes are obtained by the provision of a novel and highly improved multi-component wax emulsion, the novelty residing in the presence of a mono or dialkyl ester of an alpha-omega dicarboxylic acid having from about 4 to about 10 carbon atoms, the esterifying portion of which are substantially straight chain alkyl groups having from about 18 to about 36 carbon atoms and more preferably from about 18 to about 26 carbon atoms. Typical of the ester groups are octadecyl, nonadecyl, eicosanyl, heneicosanyl, docosanyl, tricosanyl, tetracosanyl, pentacosanyl, hexacosanyl and the like. It also should be noted that when diesters are utilized the ester groups may be the same or different.

Representative of the preferred specific alpha-omega dicarboxylic acids utilized in preparing these esters are malonic acid, succinic acid, glutaric acid, adipic acid, pimelic acid, suberic acid, azelaic acid, sebacic acid, maleic acid, fumaric acid, and acetylene dicarboxylic acid.

Representative of preferred groups of esters are as follows.

A dialkyl ester of a saturated straight chain alpha-omega dicarboxylic acid having 3–5 carbon atoms wherein each of the alkyl groups generally contains from about 18 to 36 carbon atoms and preferably from 18 to about 26 carbon atoms.

Another preferred sub-group of esters is a dialkyl ester of a symmetrical saturated dicarboxylic acid having 6–10 carbon atoms wherein each of the alkyl groups generally contain from about 18 to about 36 carbon atoms and preferably from about 18 to about 26 carbon atoms.

Still another is a monoalkyl ester of a symmetrical unsaturated 1,2-dicarboxylic acid having 4 carbon atoms wherein the alkyl group generally contains from about 18 to about 36 carbon atoms and preferably from about 18 to about 26 carbon atoms.

Also, a dialkyl ester of a symmetrical unsaturated 1,2-dicarboxylic acid having 4 carbon atoms wherein each of the alkyl groups generally contains from about 18 to about 36 carbon atoms and preferably from about 18 to about 26 carbon atoms.

Examples of preferred specific esters for use in the multi-component wax formulation of this invention are dioctadecyl maleate, didocosanyl maleate, didocosanyl acetylene dicarboxylate, didocosanyl succinate, didocosanyl adipate, monodocosanyl maleic acid, and didocosanyl terephthalate.

The alcohols which may be reacted with the dicarboxylic acids to form the diesters of this invention are alcohols having from about 18 to about 36 carbon atoms. The most preferred alcohols are those having from about 18 to about 26 carbon atoms since the esters produced from this preferred range of alcohols are more economical and exhibit properties of the most preferred waxes produced from natural sources. Usable waxes are produced from branched chain alcohols in the foregoing molecular weight ranges. The most particularly preferred alcohols are those having an even number of carbon atoms since these alcohols are more readily obtained and more economical. However, the alcohols employed in this invention are preferably essentially straight chain saturated aliphatic alcohols having up to about 20 weight percent of beta branched alcohols present. Generally, the beta branched alcohols present in the alcohol reactant have the formula

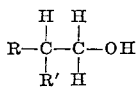

wherein R and R' are substantially straight chain alkyl groups having a total of from about 16 to about 34 carbon atoms. Most preferably, aliphatic alcohols having branched alcohol contents ranging on a weight basis from about 0 percent up to about 10 percent are employed. While not desiring to be bound by theoretical considerations it is believed that a low beta branched alcohol content in the alcohol reactant of this invention imparts to the diester product superior hardness.

Typical examples of the alcohols which may be employed in the process of this invention are n-octadecanol, n-nonadecanol, n-eicosanol, n-heneicosanol, n-docosanol, n-tricosanol, n-tetracosanol, n-pentacosanol, n-hexacosanol, n-heptacosanol, n-octacosanol, n-nonacosanol, n-triacontanol, n-hentriacontanol, n-dotriacontanol, n-tetratriacontanol, n-pentatriacontanol, and n-hexatriacontanol.

Typical of the beta branched alcohols present in the alcohol reactant are beta-ethyl hexadecanol, beta-butyl hexadecanol, beta-hexyl eicosanol, beta-ethyl eicosanol, beta-ethyl docosanol, beta-hexyl hexacosanol, and the like.

Typical examples of the mixtures of straight chain alcohols containing beta branched alcohols are 10 percent beta-ethyl eicosanol–90 percent n-docosanol; 20 percent beta-ethyl hexadecanol–80 percent n-octadecanol; 5 percent beta-hexyl octadecanol–95 percent n-tetracosanol, and the like.

Alcohols having a number of carbon atoms greater than the above preferred alcohols may also be used to produce the diesters having the property of hardness. Typical of these alcohols are heptatriacontanol, octatriacontanol, nonatriacontanol, tetracontanol, hentetracontanol, dotetracontanol, tritetracontanol, tetratetracontanol, octatetracontanol, pentacontanol, pentapentacontanol, hexacontanol, and the like.

These long chain primary alcohols are conveniently produced from alpha-olefins by any of a number of techniques. For example, long chain alpha-olefins (i.e. $C_{18}$ to $C_{36}$ alpha-olefins) may be treated with an acid in the presence of a peroxide to obtain an anti-Markownikoff addition product. A typical example of this is the reaction of the desired alpha-olefin with hydrogen bromide in the presence of a peroxide to obtain an alkyl bromide which can be converted to the primary alcohol by hydrolysis. Still another technique of obtaining the desired alcohols is by hydroboration. A typical example of a hydroboration reaction is the addition of sodium borohydride and boron trifluoride diethyl etherate complex in a solvent such as the dimethyl ether of diethylene glycol. To this mixture is added the alpha-olefin which reacts with the diborane, which was formed in situ, to produce the hydroborated olefin. The hydroborated olefin is then treated with sodium hydroxide and hydrogen peroxide to obtain the primary alcohol. The hydroboration process is essentially set forth in the "Journal of Organic Chemistry," September 1957, pages 1136 and 1137.

The advantages of the novel compositions of this invention are many in number. As stated hereinbefore, these novel wax formulations form a film having a hardness within the carnauba-candelilla wax range. These compositions also exhibit excellent luster when applied to a surface to be waxed. Raw waxes, such as candelilla, obtained from natural sources are expensive and require purification and bleaching. In contrast, the mono and diesters of this invention involves but a fraction of the cost of the natural candelilla waxes and require no bleaching and purification process, the ester products being white solids. Furthermore, many natural waxes have an odor which must be disguised by the addition of an additive to lessen its odoriferous properties. Unlike these natural products, the esters of the present invention have no odor, or at least no offensive odor. Still another advantage will be seen from the ensuing description.

The novel esters of this invention may be produced by many esterification methods. For example, the desired high molecular weight alcohol reacted with the desired dicarboxylic acid (or the anhydride thereof) at a temperature ranging from about 90° C. to about 300° C. in the presence or absence of any of the recognized solvents which are inert to the reactants and the reaction products such as benzene, toluene, xylene, hexane, cyclohexane, and the like. An esterification catalyst, although not necessary, may be employed. Typical of useful catalysts are sulfuric acid, phosphoric acid and p-toluene sulfonic acids.

Another method of producing these novel esters is by reacting the anhydride of the desired acid or the acid itself with the alcohol at temperatures ranging from about 90° C. to about 150° C. to produce the half or mono ester. If the diester is the desired compound then the half ester is further reacted with the remainder of the alcohol in the system at higher temperature, i.e., from about 180° C. to about 270° C., with $CO_2$ bubbled through the reaction mass. The diester is recovered upon cooling.

The following table sets forth the hardness of the film-forming esters of the wax compositions of the present invention. This table then demonstrates that the films formed by the multi-component wax emulsion of this invention have a hardness within the carnauba-candelilla range.

TABLE.—COMPARATIVE PENETROMETER TESTS

| Material tested: | Penetrometer reading [1] |
|---|---|
| Carnauba wax | 2 |
| Candelilla wax | 4 |
| Stearic acid | 7 |
| Montan wax | 17.5 |
| Beeswax | 32 |
| Docosene-1 | ([2]) |
| The ammonium salt of mono-dicosanyl maleic acid | ([2]) |
| Dioctadecyl maleate | 5 |
| Didocosanyl maleate | 3 |

| Material tested: | Penetrometer reading [1] |
|---|---|
| Didocosanyl acetylene dicarboxylate | 2 |
| Didocosanyl succinate | 1.5 |
| Monodocosanyl maleic acid | 4 |
| Didocosanyl adipate | 5 |

[1] Readings taken under standard conditions, i.e., for 5 seconds, at 25° C. and with a 100 g. weight according to ASTM test No. D1168–51T.
[2] Too soft to measure.

Comparative emulsion wax formulations were made of carnauba wax and didocosanyl succinate. These emulsions were prepared in accordance with the procedures described by H. Bennett in "Practical Emulsions," Chemical Publishing Company (1943), pages 368–9, by mixing 15 grams of didocosanyl succinate and 2.5 grams of oleic acid which is then stirred and melted, adding 1.5 grams of triethanol amine, then adding 1.5 grams of boiling water in 5 portions with vigorous stirring, which stirring was continued for 15 minutes. The emulsion was applied to a piece of vinyl floor tile and penetrometer tests run to determine the hardness.

Also comparative water emulsions were made of carnauba wax and each of the other esters, i.e., dioctadecyl maleate, didocosanyl maleate, didocosanyl acetylene dicarboxylate, monodocosanyl maleic acid, and didocosanyl adipate. These emulsions were prepared in accordance with the procedures described by H. Bennett (supra) page 367, Formula No. 7. This emulsion procedure comprised mixing 11.2 grams of the wax which is stirred and melted, with 2.4 grams of oleic acid and 2.2 grams of morpholine. Boiling water (67 grams) is added in portions to the rapidly stirring mixture. A second emulsion is prepared by adding boiling water, 15.5 grams, to a stirring mixture of shellac (15.5 grams) and 0.2 gram of morpholine. The separate emulsions are then mixed and stirred together. This procedure was completed for both carnauba and didocosanyl maleate. The carnauba wax emulsion was applied to a piece of vinyl floor tile and compared to the wax emulsions of the present invention. The formulations containing dioctadecyl maleate, didocosanyl maleate and didocosanyl acetylene dicarboxylate had a similar glossy appearance when compared to the vinyl tile treated with the carnauba wax emulsion. The formulation containing didocosanyl adipate had a gloss essentially equal to the vinyl tile treated with the same formulation containing candelilla wax.

While it is apparent that the number of wax formulations which can be prepared with the esters described herein is legion, the invention is specifically directed to wax formulations which are described as polishing emulsions, i.e., polishing wax formulations which contain in addition to these film-forming esters, water and an emulsifying agent.

The examples below describe various formulations of this invention. All parts are in parts by weight unless otherwise specified.

Example I

An automobile polishing formulation is prepared as follows. 30 parts didocosanyl succinate is blended with 20 parts Glyco Wax B, 68 parts naphtha and 17 parts turpentine. This mixture is melted together by keeping the temperature below 100° C. Another mixture is prepared by dissolving 10 parts borax in 70 parts water and heating to a boil. Mix the former melt with the water-borax solution slowly while stirring vigorously.

Example I is repeated utilizing dihexacosanyl malonate, didotriacontanyl glutarate and dihexatricontanyl succinate.

Example II

An automobile polishing formulation is prepared as follows. 4.0 parts monodocosanyl maleic acid is mixed with 3.0 parts bleached montan wax, 1.5 parts yellow beeswax, 1.5 parts Japan wax, and 1.0 part Glyco Wax. This mixture is melted at about 100° C. Another mixture is formed by adding to 35 parts water the following materials, 0.2 part potash carbonate, 0.3 part borax, and 0.5 part black soap. The latter mixture is added slowly to the first mixture. Heating is continued until saponification is finished. Then a mixture composed of 10.0 parts turpentine and 10.0 parts kerosene is prepared and added to the formulation. The total mixture is then stirred until ambient temperature is reached.

Example II is repeated utilizing in place of monodocosanyl maleic acid the following materials. Dioctadecyl maleate, didocosanyl maleate, didocosanyl acetylene dicarboxylate, didocosanyl succinate and didocosanyl adipate.

Example III

A floor polish is prepared as follows. 10.0 parts didocosanyl adipate is mixed with 1.4 parts triethanol amine, 1.4 parts oleic acid and 1.0 part borax. This mixture is liquefied by heating. Another mixture is prepared of 1.4 parts refined shellac, 0.2 part ammonium hydroxide and 100 parts water. The latter mixture is added to the former mixture slowly while stirring.

Example III is repeated utilizing instead of dioctadecyl azelate, dihexecosanyl sebacate and dioctadecyl maleate.

Example IV

A leather polish is prepared as follows. 5.0 parts montan wax is mixed with 5.0 parts octadecyl maleate, 510 parts bleached montan wax, 2.0 parts beeswax, 1.0 parts Japan wax and 12.0 parts paraffin wax. This mixture is added to a sufficient temperature to melt all components. A mixture composed of 72.0 parts water and 1.7 parts potash is blended slowly with the first mixture and the resultant mixture is stirred until ambient temperatures are reached.

Example IV is repeated except that the following compounds are substituted for the dioctadecyl maleate. These compounds are dihexecosanyl succinate, didotriacontanyl acetylene dicarboxylate, dihexatricontanyl fumarate, didocosanyl maleate and didocosanyl acetylene dicarboxylate.

As was indicated above, the wax formulations of the invention are emulsions containing in conjunction with the film-forming ester, water and an emulsifying agent. The water is present in the formulation in an amount ranging from about 5 to about 90 weight percent and preferably from about 10 to about 70 weight percent. The film-forming ester is present in the emulsion in an amount ranging from about 2 to about 40 weight percent and preferably from about 3 to about 20 weight percent. There is no absolute requirement for these concentrations as they will depend on the specific use intended.

The emulsifiers or emulsifying agents are of the class of compounds sometimes referred to as surface-active agents which includes wetting agents, solubilizers, detergents, suspending agents and the like. The following constitutes illustrative examples of materials which are used either separately or in mixtures to emulsify the formulations of this invention. Organic acids are good emulsifiers especially those containing from 1 to 40 carbon atoms and the Group IA and IIA metal salts thereof, the fatty acids and fatty acid salts being most preferred. Examples of very suitable acids are lauric acid, myristic acid, palmitic acid, margaric acid, stearic acid, arachidic acid, behenic acid, lignoceric acid, cerotic acid, melissic acid, oleic acid, elaidic acid, linoleic acid, and alpha-elestearic acid. The salts of the aforementioned acids that are adaptable for use as emulsifiers are the salts formed from lithium, sodium, potassium, rubidium, cesium, beryllium, magnesium, calcium, strontium and barium. The ammonium salts of the fatty acids are also useful. Other classes of emulsifying agents are the polyglycol fatty acid esters, polyoxyethylene fatty alcohol ethers, lecithin, cholesterol esters, lanolin, quaternary ammonium salts, amines and amine hydrochlorides.

Others are borax, triethanol amine, black soap, potash carbonate, soft soap, potassium carbonate, saponin, suspensone, camphor oil, glycerine, ammonium hydroxide, morpholine, sodium hydroxide, yellow soap, sodium tetraborate, and castile soap. The specific emulsifying agent and emulsifying and proportion of emulsifier technique will be readily discernible by those skilled in the art, e.g. Warth and Bennett (previously cited) describe many emulsifiers and techniques for forming polishing formulations.

The wax formulations of this invention are useful for polishing floors and furniture, automobiles, leather goods and the like.

What I claim as new and desire to secure as Letters Patent in the United States is as follows.

1. A multicomponent wax emulsion polish consisting essentially of from about 2 to about 40 weight percent of a film-forming agent, from about 5 to about 90 weight percent water and an emulsifying agent, said film-forming agent being at least one selected from the group consisting of didotriacontanyl acetylene dicarboxylate and didocosanyl acetylene dicarboxylate.

2. The wax emulsion polish of claim 1 further characterized wherein said film-forming agent is didocosanyl acetylene dicarboxylate.

3. The wax emulsion polish of claim 1 further characterized wherein said film-forming agent is present in an amount ranging from about 3 to about 20 weight percent.

4. The wax emulsion polish of claim 1 further characterized wherein said water is present in an amount ranging from about 10 to about 70 weight percent.

References Cited by the Examiner
UNITED STATES PATENTS

| | | | |
|---|---|---|---|
| 2,993,800 | 7/1961 | Pickell | 106—271 |
| 3,031,376 | 4/1962 | Levin et al. | 260—485 |
| 3,129,104 | 4/1964 | Callinan et al. | 106—31 |

OTHER REFERENCES

Characterization of Organic Compounds, McElvain, rev. ed.; The Macmillan Co., New York, 1945, p. 54 relied upon.

Organic Chemistry, Lucas, 2nd edition, American Book Company, pp. 50–51 relied upon.

Practical Emulsions, Bennett, Chemical Publishing Company, New York, 1943 (chapter XVI, "Polish Emulsions," relied upon).

ALEXANDER H. BRODMERKEL, *Primary Examiner.*

J. B. EVANS, *Assistant Examiner.*